Sept. 11, 1962 J. E. FIESER 3,052,980
ELECTRIC DEHORNING APPARATUS
Filed Sept. 19, 1960 2 Sheets-Sheet 1

*INVENTOR.*
JOHN E. FIESER
BY
John H. Widdowson
ATTORNEY

Sept. 11, 1962
J. E. FIESER
3,052,980
ELECTRIC DEHORNING APPARATUS
Filed Sept. 19, 1960
2 Sheets-Sheet 2
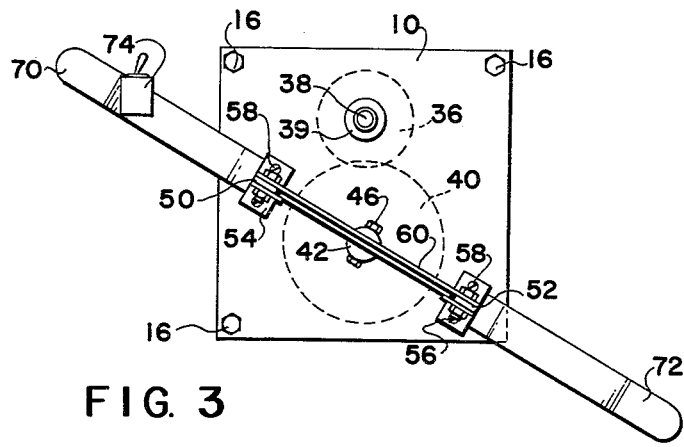
FIG. 3
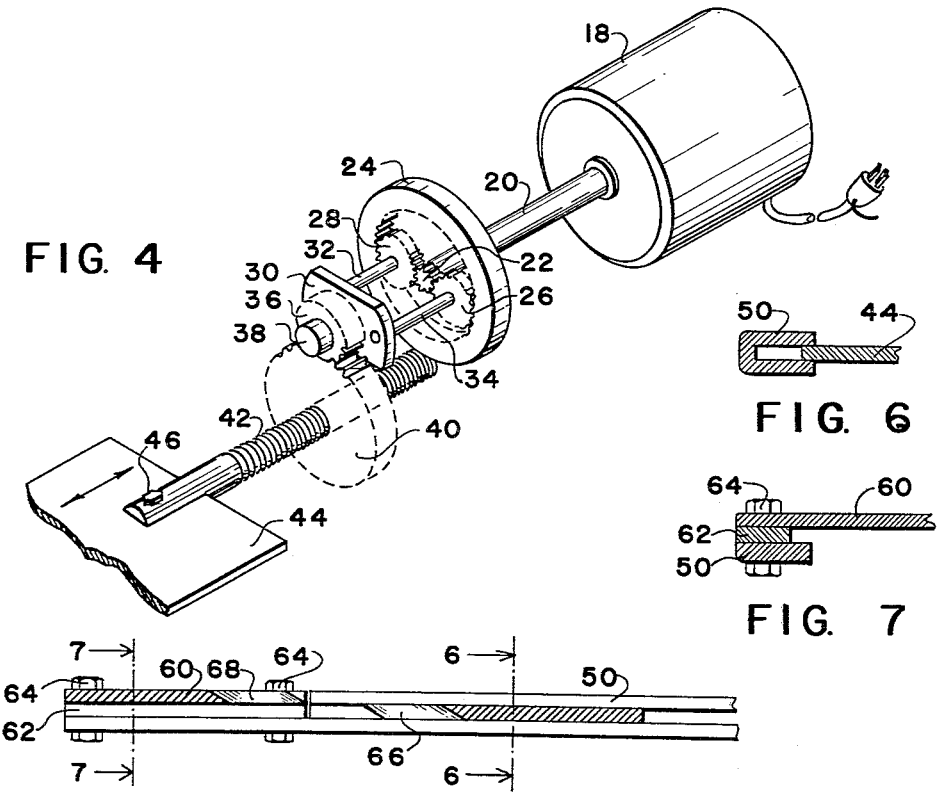
FIG. 4
FIG. 6
FIG. 7
FIG. 5
INVENTOR.
JOHN E. FIESER
BY
John H. Widdowson
ATTORNEY

United States Patent Office 3,052,980
Patented Sept. 11, 1962

3,052,980
ELECTRIC DEHORNING APPARATUS
John E. Fieser, Clearwater, Kans.
Filed Sept. 19, 1960, Ser. No. 56,755
7 Claims. (Cl. 30—228)

This invention relates to a means for dehorning animals, and in particular to an electric powered dehorning apparatus.

Various types of cutting and/or dehorning apparatus are known. These include devices which are intended to be mounted on the animal itself, and various manually operated cutting means for dehorning. These devices have generally proved unsatisfactory due to the complicated structure involved and the lack of suitable power means to accomplish the operation. In spite of prior art attempts at constructing powered dehorning apparatus, the average farmer and veterinarian still primarily utilizes saws or other hand operated cutting means for the dehorning operation.

In accordance with the present invention a new dehorning apparatus is provided which is power operated and can be easily used by a single operator. The apparatus, by being powered other than by manual means, permits a quick, clean cut to be made of the animal's horn with a minimum of effort by the operator.

The preferred electric powered dehorning apparatus of the invention includes a housing. Power means, preferably a reversible electric motor, is mounted on or in the housing. Blade means, preferably having facing V-shaped cutting edges are provided so that the power means causes the blades to close during the cutting operation. Suitable guides can be provided for the blades and handles on the housing to improve operation of the apparatus.

Accordingly, it is an object of the invention to provide a new dehorning apparatus.

Another object of the invention is to provide a new electric powered dehorning apparatus.

Another object of the invention is to provied a new powered dehorning apparatus having coacting V-shaped cutting edges to positively align the horn during the cutting operation.

A further object of the invention is to provide a new and improved electric powered dehorning apparatus which can conveniently be used by one person.

A still further object of the invention is to provide relatively inexpensive, efficient dehorning apparatus.

Various other objects, advantages and features of the invention will become apparent from the following description taken in connection with the accompanying drawings, in which:

FIG. 3 is a front view of the dehorning apparatus.

FIG. 4 is a diagrammatic isometric view showing a preferred manner of driving the cutting blade.

FIG. 5 is an enlarged partial cross section view taken along the line 5—5 of FIG. 2.

FIG. 6 is an enlarged partial cross section view taken along the line 6—6 of FIG. 5.

FIG. 7 is an enlarged partial cross section view taken along the line 7—7 of FIG. 5.

Figure 1:
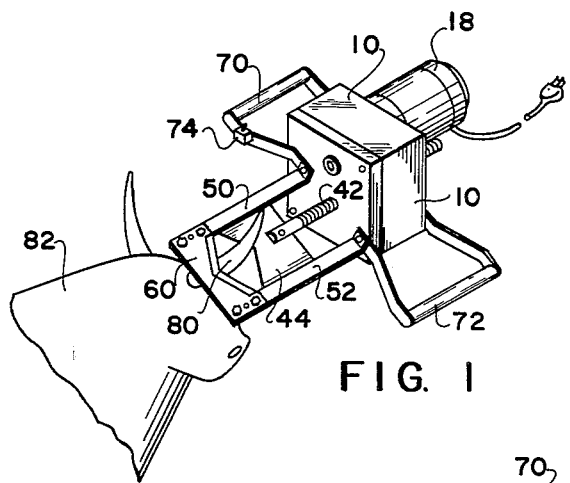
FIG. 1 is an isometric view showing the electric dehorning apparatus of the invention in operation.
Figure 2:
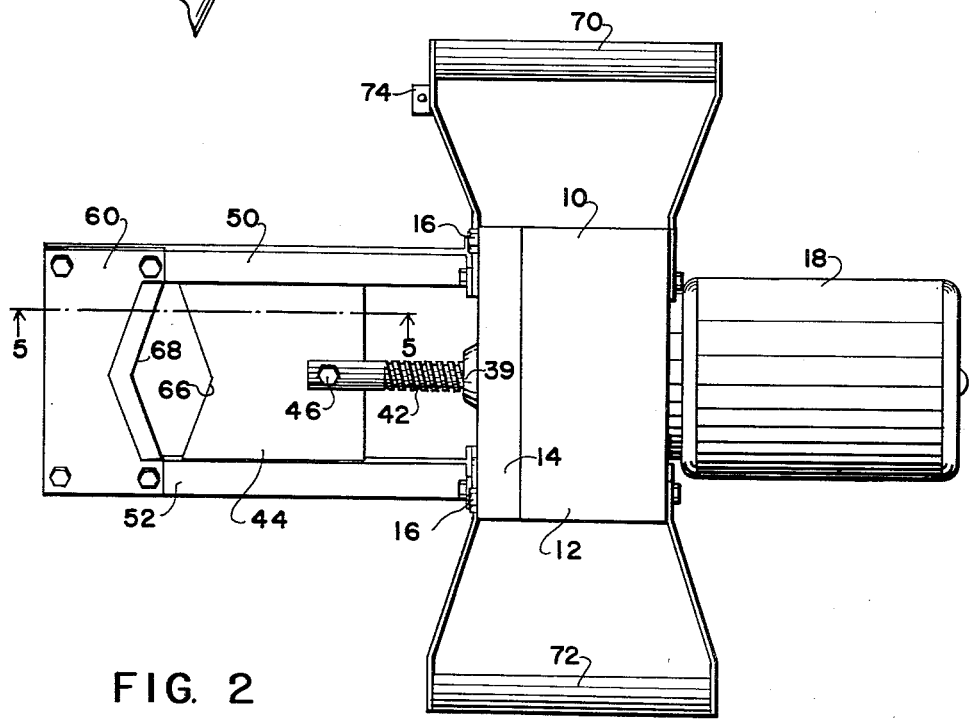
FIG. 2 is an enlarged top plan view of a preferred specific embodiment of the dehorning apparatus of the invention.

The following is a discussion and description of a preferred specific embodiment of the new electric dehorning apparatus of the invention, such being made with reference to the drawings whereon the same reference numerals are used to indicate the same or similar parts and/or structure. It is to be understood that such discussion and description is not to unduly limit the scope of the invention.

The dehorning apparatus of the invention includes a housing 10 which includes a base portion 12 and a lid or closure member 14 which is secured to the base 12 by mounting bolts 16 or by other suitable means. The housing 10 can be a precast aluminum housing, or it can be made of separate metallic or non-metallic members assembled into the desired shape and size.

The dehorning apparatus of the invention is preferably powered by an electric motor such as shown at 18. The electric motor 18 is preferably a reversible electric motor and is secured to or in the housing 10 in any suitable manner so that the shaft 20 is received within the housing 10. The end of shaft 20 within the housing preferably has a pinion gear 22 secured thereto.

Suitable reduction gearing is provided within housing 10. A preferred construction of this gearing is shown in FIG. 4 where an annular gear 24 is fixed within the housing 10 in any suitable manner. Gear 24 is internally toothed and is concentric with the pinion gear 22.

Planetary gears 26 and 28, which are preferably of equal size, are positioned between pinion gear 22 and annular gear 24 and in engagement therewith so as to be turned about pinion gear 22 when the shaft 20 of the electric motor 18 is being rotated. Planetary gears 26 and 28 are preferably spaced 180 degrees apart as shown in the drawings, however more or less than two of these gears can be used, if desired.

A plate 30 is provided which has pins 32 and 34 rigidly secured thereto. The pins 32 and 34 are spaced so that they are received in central openings in the planetary gears 28 and 26 respectively. Plate 30 is thus mounted to rotate with planetary gears 26 and 28 and to be coaxial with shaft 20 of motor 18. A gear 36 is mounted on the face of plate 30 opposite from the gears 26 and 28. A cylindrical bearing 38 can be centrally mounted on the end of gear 36 so as to project through or be received by the front wall of housing 10. A suitable projection 39 on housing 10 can be used if desired to receive bearing 38 so as to permit the mounting of the gearing and the electric motor rigid within the housing 10.

Gear 36 meshes with and turns a toothed wheel 40. Wheel 40 has a central opening therein which is threaded and which receives a screw threaded ram 42. Ram 42 projects from at least one end of the housing 10 and preferably extends from both ends and is suitably supported by the housing. It will be seen from the foregoing description of the gearing arrangement that the output of electric motor 18 will be transferred to ram 42 through the gearing and that ram 42 can be moved into or out of the housing, depending upon the direction of rotation of motor 18 and shaft 20. Ball bearings can be provided in the central opening of wheel 40 to ride in the threads of ram 42, to materially increase the efficiency of the device.

A blade 44 is secured to one end of ram 42 by any suitable means, such as by cutting a slot in the end of ram 42 to receive blade 44 which is held therein by a mounting bolt 46. Other suitable means of mounting blade 44 on ram 42 can be used if desired.

Two spaced and parallel guide members 50 and 52 are provided and are secured to the housing 10 in any suitable manner, such as by providing flanges 54 and 56 at one end of the guides 50 and 52 respectively which are secured to the housing by mounting bolts 58. Guide members 50 and 52 are preferably U-shaped in transverse cross section as shown in FIG. 6 so as to receive blade 44 to guide the blade during operation. Guide members 50 and 52 can be integrally formed as shown or they can be formed of separate members. The outer end portions of the guide members 50 and 52 preferably have one leg of the U and the connecting portion removed therefrom as best seen in FIG. 5.

A second blade 60 is secured to the outer end portions of the guides 50 and 52. Spacer members 62 are provided to position blade 60 in cutting relation with blade 44. Blade 60 and spacers 62 are secured to guides 50 and 52 in any suitable manner, such as by mounting bolts 64. Spacing members 62 are dimensioned relative to blade 44 to permit the sliding movement of blade 44 within guide members 50 and 52 and beneath blade 60.

The blades 44 and 60 preferably have V-shaped cutting edges 66 and 68 respectively in facing relation so that during operation a horn or the like positioned therebetween will not be moved sideways during the cutting operation but will be held firmly in place.

Handles 70 and 72 of common construction are provided and are secured to the housing 10 in any suitable manner. The handles can be mounted on the housing by the same mounting bolts used to secure the guides 50 and 52 thereto, and the handles are preferably disposed in the plane of the guide members for ease of operation. A switch 74 is provided to operate the electric motor 18 and is preferably secured to one of the handles for ease of operation. Switch 74 is preferably a three position switch so that switch 74 can be used to turn motor 18 to the reverse, forward or off position.

In operation, the dehorning apparatus can conveniently be used by a single individual by grasping handles 70 and 72 and operating switch 74 so that the blades 44 and 60 are spaced apart. The horn 80, FIG. 1, of the horned animal 82 is received between the spaced blades 44 and 60 and switch 74 is turned so that electric motor 18 is turned on. Pinion 22 will thus be rotated and planetary gears 26 and 28 driven. This in turn rotates gear 36 and tooth wheel 40 which moves ram 42 and blade 44 secured thereto within guides 50 and 52 toward blade 60. As the blades converge, the horn 80 will be moved by the edge portions of the blade to the center so the horn 80 is accurately aligned between the center of the V-shaped cutting edges 66 and 68. As blade 44 continues to be urged toward blade 60 the horn therebetween will be quickly and easily severed. Switch 74 can then be moved to the reverse position to back blade 44 off for use on the other horn of the animal.

The device can also be provided with limiting switches so that the movable blade 44 can be limited in its movement to prevent jamming at either end of the guides. This can be done by mounting limiting switches on one of the guides which is engaged by an operator secured to the ram 42 when it reaches the outermost or innermost position of the ram. If desired, automatic reversal of the movement of the ram can be provided by a similar arrangement where the switch operator mounted on the ram will engage the reversing switch when blade 44 has reached the outermost position. In either instance, this permits the user to immediately set the apparatus aside when the horn has been severed so that any artery severed in the horn can be tied off or closed relatively quickly without it being necessary for the operator to first stop or reverse the motor 18.

The apparatus shown and described has been used and found to perform equally well on relative small and extremely large horns. The device has also been found to function rapidly and make a clean cut through the horn with a minimum of effort on the part of the user. The use of an electric driven dehorning apparatus is particularly desirable when compared to the prior art hand operated devices since the user can devote his time and attention to making the proper cut without the necessity of additionally applying the required manual power to operate the blades. Also, the spaced V-shaped type blades provide a desirable guiding effect for the horn, positioning it in the center of the V-shaped blade as the cutting progresses.

It will be evident to those skilled in the art that various modifications of this invention can be made, or followed, in the light of this description and discussion, without departing from the spirit of the disclosure or the scope of the claims.

I claim:
1. An electric powered dehorning apparatus comprising, in combination, a housing, a reversible electric motor secured to one end of said housing with the shaft thereof projecting into said housing, the end of said shaft in said housing having a pinion gear thereon, an annular internally toothed gear fixed in said housing and concentric with said pinion gear, two planetary gears of equal size, said planetary gears being positioned between and in engagement with said pinion and said annular gear and being spaced 180 degrees apart, a plate secured to one face of said planetary gears for rotation therewith, another gear secured to said plate for rotation therewith, said last-named gear being coaxial with said pinion gear, said last-named gear engaging with and rotating a toothed wheel, said wheel being internally threaded, and a screw threaded ram, said ram being threadedly received by said wheel and extending from opposite ends of said housing, a blade secured to one end of said ram, said blade having a V-shaped cutting edge, two spaced and parallel guide members extending from said housing, each of said guide members slidably receiving and guiding one edge of said blade, and a second blade positioned between and secured to the outer end portions of said guide members, said last-named blade having a V-shaped cutting edge facing said first-named blade, two handles secured to opposite sides of said housing and extending therefrom generally in the plane of said guide members, and a switch for said motor mounted on one of said handles, said device being constructed and adapted so that said switch will activate said electric motor to rotate said gears and turn said wheel, which in turn moves said ram causing said first-named blade to be moved in said guide toward and away from said last-named cutting blade so that an animal's horn positioned between said blades can be severed.

2. An electric dehorning apparatus comprising, in combination, a housing, a reversilbe electric motor secured to said housing with the shaft thereof projecting into said housing, said shaft having a pinion gear on the end thereof, a fixed internally toothed gear in said housing, planetary gearing between said pinion and said fixed gear, another gear mounted for rotation with said planetary gears, and an externally toothed wheel, said wheel engaging with said last-named gear for rotation therewith, said wheel being internally threaded, a screw threaded ram received by said wheel and extending from said housing, a V-shaped cutting blade mounted on said guide means and facing said first-named blade, handles secured to said housing, and a switch for said motor mounted on said handles, said device being constructed and adapted so that said switch will activate said electric motor to rotate said gears and turn said wheel, which moves said ram causing said blades to be placed in cutting relation.

3. An electric dehorning apparatus comprising, in combination, a housing, a reversible electric motor secured to said housing, a ram movably mounted in said housing and extending therefrom, said ram being driven by said motor, a cutting blade secured to one end of said ram, guide means for said cutting blade, a second cutting blade secured to said guide means, handles secured to said housing, and a switch on said apparatus for controlling said motor, said apparatus being constructed and adapted so that said electric motor will cause said ram to move toward and away from said last-named cutting blade so that said first-named cutting blade will be urged into cutting engagement with said last-named blade.

4. An electric dehorning apparatus comprising, in combination, a housing, an electric motor secured to said housing, a ram, said ram having a blade secured to one end thereof, gearing means between the shaft of said motor and said ram to drive said ram, guide means for said blade, second blade means secured to said guide means to cooperate with said first-named blade, said apparatus being constructed and adapted so that said electric motor will move said ram with said blade thereon toward and away from said second blade means.

5. An electric dehorning apparatus comprising, in combination, a housing, an electric motor mounted on said housing, guide means mounted on and extending from said housing, a fixed blade mounted on said guide means, a movable blade guided by said guide means, and a ram secured to said movable blade and projecting into said housing, said ram being driven by said electric motor so that said cutting blades can be placed into cutting engagement.

6. Dehorning apparatus comprising, in combination, a housing, power means on said housing, guide means mounted on and extending from said housing, a fixed blade secured to said guide means, a movable blade guided by said guide means, a ram secured to said movable blade and projecting into said housing, and gearing means transmitting the output of said power means to said ram to move said ram and said movable blade in said guide.

7. Dehorning apparatus comprising, in combination, support and mounting means, hand hold means connected to said support and mounting means, guiding means with said support and mounting means, a relatively thin and knife-edged blade movably mounted in said guiding means with the plane of said blade substantially coplanar with the plane of said guiding means, another relatively thin blade having a cutting edge and mounted on said support and mounting means with the plane thereof parallel to the plane of said movable blade to cooperate with said movable blade in cutting operation, ram means secured to said movable blade, a reversible electric motor operatively connected to said ram means, and switching means operatively connected to said motor and operable to selectively move said movable blade toward and away from said another blade during a horn cutting operation cycle and to stop said motor.

References Cited in the file of this patent

UNITED STATES PATENTS

| 2,244,638 | Boardman | June 3, 1941 |
| 2,764,813 | Hoffman | Oct. 2, 1956 |
| 2,766,525 | Hoffman | Oct. 16, 1956 |
| 2,810,955 | Hoffman | Oct. 29, 1957 |
| 2,827,696 | Yermish | Mar. 25, 1958 |

FOREIGN PATENTS

| 410,320 | Great Britain | May 17, 1934 |
| Add. 43,755 | France | June 11, 1934 |